Aug. 6, 1957     H. L. FERVERDA     2,802,120
PROCESS FOR BONDING DYNAMOELECTRIC MACHINE COIL
END TURNS AND ARTICLE PRODUCED THEREBY
Filed March 27, 1956
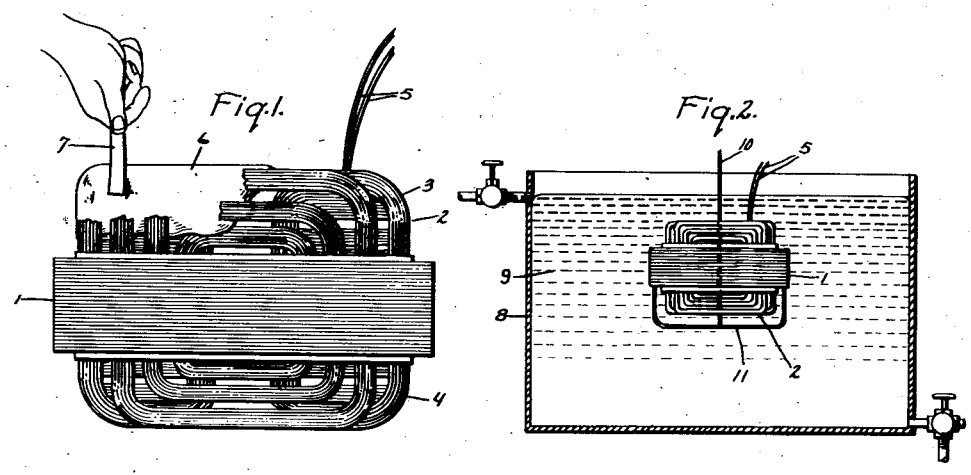
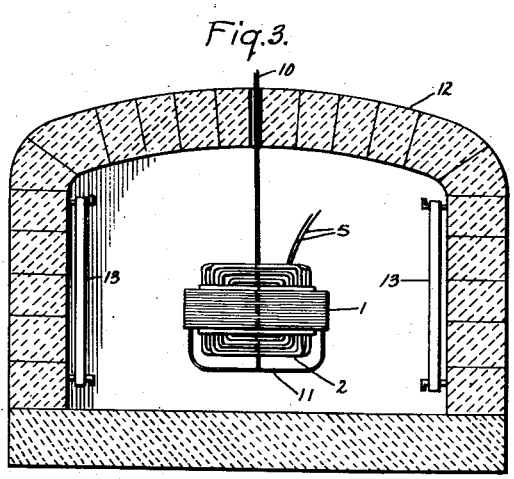
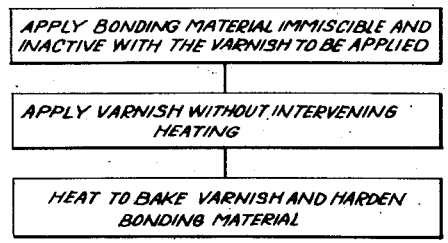
Inventor:
Harold L. Ferverda,
by Robert G. Irish
His Attorney.

United States Patent Office 2,802,120
Patented Aug. 6, 1957

2,802,120

PROCESS FOR BONDING DYNAMOELECTRIC MACHINE COIL END TURNS AND ARTICLE PRODUCED THEREBY

Harold L. Ferverda, Fort Wayne, Ind., assignor to General Electric Company, a corporation of New York Application March 27, 1956, Serial No. 574,284

12 Claims. (Cl. 310—45)

This invention relates to dynamoelectric machines and more particularly to a process for bonding the end turns of coils wound in the core members of such machines.

When coils are wound into the core of a dynamoelectric machine, the end turns of the coils extend from each end of the core member. Where the coil is formed of wire, the end turns may, if not restrained, be sufficiently loose so that one or more turns of the wire may be displaced during the manufacturing process into a position where they will interfere with the other member of the machine during rotation. Accordingly, it has become customary to provide some method of restraining the end turns of coils of this type so as positively to preclude any such undesirable occurrence. A method frequently used is to bond the end turns by dipping the entire core member with the coil wound thereon into varnish and then baking the varnish. Between the application of the varnish and the heating step, it is customary to let the varnish drain so that excess liquid will not be present during the heating step. During the draining process, the varnish will, of course, tend to move toward that part of the core which is lowest so that the upper part of the coil, that is, the top end turns as opposed to the bottom end turns will be relatively starved for varnish. This generally occurs at that end of the core where the leads to be secured to an outside source of power extend since such leads are generally maintained up out of the varnish. The lack of varnish at the upper end frequently reaches proportions such that the bonding effect is not performed satisfactorily so that one can be sure that the turns of wire will be maintained out of the path of relative rotation. It thus has frequently been necessary to provide additional restrictive means at one end of the dynamoelectric machine core member to maintain the end turns in place. These methods have been of various types and have generally entailed considerable additional expense in the manufacture of the motor. One frequently used approach is to apply a particularly viscous varnish to the inner bore of the end turns, bake this varnish, and then apply varnish to the entire core in the customary manner. While this process has worked in the desired manner to maintain the turns of wire out of the path of the rotating member, it has also required an additional heating step. It is most desirable to effect the additional bonding of the end turns which receive an excessively small amount of varnish by a process which will be as economical as possible and will avoid the expense of an additional heating step.

It is, therefore, an object of this invention to provide an improved process for bonding the end turns of a dynamoelectric machine which will provide the advantageous features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broader aspect, this invention provides a process for bonding the end turns of a coil positioned on a dynamoelectric machine core member which includes the first step of applying a bonding material to that part of the end turns to be secured. Thereafter, without any intermediate heating step, varnish is applied to the coil. The varnish and the bonding material are selected to be chemically inactive and physically immiscible with respect to each other so that they will remain separately on the coil even though the coil is immersed in varnish directly after the application of the bonding material. After the application of varnish, and after suitable draining, heat is applied to the core member so as to bake the varnish and harden the bonding material.

A second provision of the invention is, consequently, the dynamoelectric machine core member construction provided by the above process.

In the drawing,

Figure 1 is a side view, partly broken away, of a dynamoelectric core member having part of the coil end turns treated with bonding material in accordance with the first step of the improved process of the invention;

Figure 2 is a side view of a core member being subjected to the second step of the process of the invention;

Figure 3 is a view of a dynamoelectric machine core member being subjected to the third step of the process of the invention; and Figure 4 is a table illustrating the three principal steps of the invention.

Referring now to Figure 1 of the drawing, there is shown a dynamoelectric machine magnetic core member 1 normally made up of a plurality of thin laminations of magnetic material with a coil of wire 2 wound into openings (not shown) provided in the core 1 for that purpose. As shown, the coil 2 has end turns 3 and 4 which respectively extend at each end of the core member 1. A pair of leads 5 extend from the coil at one end of the core and are provided so as to permit coil 2 to be connected across an appropriate external source of power (not shown). Since the coil 2 is formed of many turns of wire, it will readily be understood that each individual turn has relatively little rigidity and that, during the handling necessary in the manufacture of such a device, one or more turns of wire may be forced into the prospective path of relative rotation with thoroughly undesirable results when the motor is eventually put into operation. In order to provide suitable bonding of the end turns where other bonding provisions are inadequate, and where it is important that no uncontrolled movement of the wire be permitted, that is, at that part of the end turns which borders against the path of relative rotation, a suitable bonding material 6 is applied. This may be effected, as shown, by means of a suitable applicator 7, but it is to be noted that any desired means may be used for the application of material 6. It will also be observed that material 6 is applied around the inner part of the end turns since it is contemplated that core member 3 will be a stationary member with a rotatable member (not shown) positioned concentrically and within core member 1.

Material 6 is preferably in a substantially pastelike form so that it will not readily flow out of the desired relationship with the coil 2. Material 6 must be a material which is chemically inactive with respect to the varnish to be applied to the core 1 (as described below) and physically immiscible therewith. Varnish used in commercial practice is generally either of the alkyl, phenolic or urea type or is a combination of the three. In addition, the varnish formulation is generally held by either an aromatic or an aliphatic hydrocarbon solvent system, with xylene and toluene being representative of the aromatic solvents, and naphtha and petroleum spirits being typical of the aliphatic solvents. An extremely desirable bonding material which is completely inactive and immiscible with the above types of varnish formulations is a material which is made up by weight of 66% epoxy resin, 27.4% clay, and 6.6% methyl diethanol amine, with the amine acting as the curing agent for the epoxy resin upon suitable application of heat. The clay is used primarily as filler, and it will be understood that the important material is the epoxy resin, with the clay providing a suitable paste-like consistency. While the epoxy resins have proved to be the most desirable, from point of use, it will be understood that the important feature is that the bonding material be physically immiscible and chemically inactive with the varnish formulation. Thus, nitrocellulose, which is insoluble in aromatic and aliphatic hydrocarbon solvent systems, represents another possible material to be used for the bonding purpose where the varnish formulation is selected from those set forth above.

After the first step of the process has been completed, as described in connection with Figure 1, and without any intervening heat treatment, the core 1 is immersed in a tank 8 containing a varnish 9 which will generally be of one of the formulations discussed in the preceding paragraph. Core 1 is usually held in the tank so as to be movable therethrough by means of a member 10 which extends from a moving conveyor (not shown) and which terminates in a hook member 11 arranged to be in engagement with core 1 at a plurality of points so as to support it. Also, the core 1 is preferably maintained sufficiently close to the surface of varnish 9, as shown, so that leads 5 extend therefrom and do not become covered with varnish.

Once the second step has been effected, as shown in Figure 2, the core 1 is removed from the varnish and is transported to a heating device which may be of any desired type such as that illustrated at 12. In the particular arrangement shown in Figure 3, a pair of heating elements 13 are provided on each side of the heating arrangement, and the core member 1 travels between the heating elements. The time interval between the removal of the core 1 from the varnish and its passage into the heating arrangement 12 is sufficiently great so that the varnish has time to drain adequately, that is, so that excess varnish will be removed by the time the curing action is started. This is normally done with the lead end of the core up so that the leads 5 do not become covered with the varnish, and may be effected in any suitable time interval (10 to 15 minutes is a period often used) as is well known in the art. Consequently, as explained above, the major part of the varnish goes to the bonding of end turns 4 and the additional provision of material 6 is necessary for the suitable bonding of end turns 3.

The core 1 and the coil 2 are heated sufficiently in device 12 so that the varnish is baked, that is, the solvents are driven off, and the bonding material 6 is hardened. While, of course, the necessary time and temperature may vary widely depending upon the precise formulation used for both the varnish and the bonding material, it has been found that, in general, a bake at 125° to 150° C. for a time interval of between 30 and 90 minutes will generally effect the desired results. However, these figures are to be taken as representative and not as an essential feature of the disclosed invention.

When the core 1 is withdrawn from heating arrangement 12, both sets of end turns will be properly bonded so as to preclude any undesirable interference with the operation of the machine. In addition, the extra bonding operation required as a result of the facts set forth above has been made exceedingly simple and the need for an extra heating operation has been eliminated.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A process for bonding the end turns of a coil positioned in a dynamoelectric machine magnetic core member comprising the steps of applying a bonding material to that part of the end turns to be secured, thereafter applying varnish to the coil without any intervening heat treatment, said material being chemically inactive and physically immiscible with the varnish, and then applying heat to the core to bake the varnish and harden the bonding material.

2. A dynamoelectric machine core member having a coil member positioned thereon with its end turns extending on each side thereof, a predetermined amount of a bonding material arranged in bonding relationship with at least part of said end turns at at least one end of said core, and varnish arranged on said coil member over said bonding material, said bonding material and said varnish being physically immiscible and chemically inactive with respect to each other.

3. A process for bonding the end turns of a coil positioned in a dynamoelectric machine magnetic core member and having electric leads extending from one end thereof, comprising the steps of applying a bonding material to that part of the end turns at the lead end which are to be secured, thereafter applying varnish to the coil without any intervening heat treatment, said material being chemically inactive and physically immiscible with the varnish, said application of varnish being made so as to maintain said leads free from varnish, allowing varnish to drain from said core member with the core member in a position such that the lead end turns are above the core member, and then applying heat to the core member to bake the varnish and harden the bonding material.

4. A dynamoelectric machine core member having a coil member positioned thereon with its end turns extending on each side thereof, a plurality of leads extending from said coil member in the region of the end turns at one end of said core member, a predetermined amount of a bonding material arranged in bonding relationship with at least part of said end turns at that end of said core member where said leads extend, and varnish arranged on said coil member over said bonding material, said bonding material and said varnish being physically immiscible and chemically inactive with respect to each other.

5. A process for bonding the end turns of a coil positioned in a dynamolectric machine stator member comprising the steps of applying a bonding material to the inner part of the end turns at at least one end of said stator member, thereafter applying varnish to the coil without any intervening heat treatment, said material being chemically inactive and physically immiscible with the varnish, and then applying heat to the stator member to bake the varnish and harden the bonding material.

6. A dynamoelectric machine stator member having a coil member positioned thereon with its end turns extending on each side thereof, a predetermined amount of a bonding material arranged in bonding relationship with the inner part of the end turns at at least one end of said stator member, and varnish arranged on said coil member over said bonding material, said bonding material and said varnish being physically immiscible and chemically inactive with respect to each other.

7. A process for bonding the end turns of a coil positioned in a dynamoelectric machine stator core member, said coil having a plurality of leads extending therefrom at one end of said stator member, said process comprising the steps of applying a bonding material to the inner part of the end turns at the lead end, thereafter applying varnish to the coil without any intervening heat treatment, said material being chemically inactive and physically immiscible with the varnish, allowing the varnish to drain from the coil with the stator member being maintained with the lead end above the stator member, and then applying heat to the stator member to bake the varnish and harden the bonding material.

8. A process for bonding the end turns of a coil positioned in a dynamoelectric machine magnetic core member comprising the steps of applying a bonding material to that part of the end turns to be secured, thereafter applying varnish to the coil without any intervening heat treatment, said material comprising epoxy resin, a filler for said resin, and a curing agent for said resin, and being chemically inactive and physically immiscible with the varnish, and then applying heat to the core to bake the varnish and harden the bonding material.

9. A process for bonding the end turns of a coil positioned in a dynamoelectric machine magnetic core member comprising the steps of applying a bonding material to that part of the end turns to be secured, thereafter applying varnish to the coil without any intervening heat treatment, said material comprising an epoxy resin, a filler for said resin, and a curing agent for said resin and being chemically inactive and physically immiscible with the varnish, said material further having a paste-like consistency at the time of application to said end turns, and then applying heat to the core to bake the varnish and cure the bonding material.

10. A dynamoelectric machine core member having a coil member positioned thereon with its end turns extending on each side thereof, a predetermined amount of a bonding material arranged in bonding relationship with at least part of said end turns at at least one end of said core, and varnish arranged on said coil member over said bonding material, said bonding material being formed of epoxy resin, an inert filler for said resin, and a curing agent for said resin, said material and said varnish being physically immiscible and chemically inactive with respect to each other.

11. A process for bonding the end turns of a coil positioned in a dynamoelectric machine magnetic core member comprising the steps of applying a bonding material to that part of the end turns to be secured, thereafter applying varnish to the coil without any intervening heat treatment, said material comprising an epoxy resin, an inert filler for said resin, and a curing agent for said resin, said varnish having a base selected from the alkyd phenolic urea group and including a solvent selected from the aromatic and aliphatic hydrocarbon systems, and then applying heat to the core to bake the varnish and harden the bonding materials.

12. A process for bonding the end turns of a coil positioned in a dynamoelectric machine stator core member comprising the steps of applying a bonding material to the inner part of the end turns at at least one end of the stator core member, thereafter applying varnish to the coil without any intervening heat treatment, said material comprising an epoxy resin, an inert filler for said resin, and a curing agent for said resin, and being chemically inactive and physically immiscible with the varnish, said material further having a paste-like consistency at the time of application to said end turns, and then applying heat to the stator core to bake the varnish and cure the bonding material.

No references cited.